United States Patent [19]

Hayes et al.

[11] Patent Number: 4,502,211
[45] Date of Patent: Mar. 5, 1985

[54] ASSEMBLING ELECTRIC STORAGE BATTERIES AND A CLAMP THEREFOR

[75] Inventors: Michael H. Hayes, Wilmslow; Ernest J. Pearson, Swinton, both of England

[73] Assignee: Chloride Group Public Limited Company, London, England

[21] Appl. No.: 547,213

[22] Filed: Oct. 31, 1983

[30] Foreign Application Priority Data

Oct. 29, 1982 [GB] United Kingdom ................. 8230957
Jul. 14, 1983 [GB] United Kingdom ................. 8319049

[51] Int. Cl.³ ............................................ H01M 10/14
[52] U.S. Cl. ..................................... 29/623.1; 29/730
[58] Field of Search ................ 29/623.1, 730; 204/2.1; 24/326; 429/186

[56] References Cited

U.S. PATENT DOCUMENTS 4,074,422  2/1978  Borjesson et al. .................... 29/730

Primary Examiner—Anthony Skapars
Attorney, Agent, or Firm—Finnegan, Henderson, Farabow, Garrett & Dunner

[57] ABSTRACT

A clamp for use in the assembly of multicell electric storage batteries comprises two spaced opposing clamping members each including a plurality of clamping elements which are connected but spaced apart by a gap. The clamping elements are arranged in two spaced parallel lines and are each adapted to contact a surface of a respective cell pack of a battery. Biassing means connects the two clamping members and is adapted to urge each clamping element of each clamping member towards a corresponding clamping element on the other clamping member.

10 Claims, 8 Drawing Figures

ASSEMBLING ELECTRIC STORAGE BATTERIES AND A CLAMP THEREFOR

The present invention relates to a method of assembling electric storage batteries, e.g. lead acid batteries and in particular batteries of the type containing substantially no mobile electrolyte, e.g. batteries in which the electrolyte is in gel form or recombination batteries. The invention relates in particular to a clamp for use in such a method for clamping the cell packs of such a battery and to a battery assembled in accordance with the method. Recombination batteries are those which contain a reduced amount of electrolyte and in which the gas evolved within them during operation or charging is not normally vented to the atmosphere but is induced to recombine within the battery.

Conventional electric storage batteries are flooded with electrolyte and to permit the electrolyte ready access to the active material on the plates the plates are spaced from the walls and intercell partitions of the battery container and only loosely contact the separator material between adjacent plates. However, in recombination batteries it is essential that the plates and separators are under a light compressive force to ensure that the separator material can provide sufficient electrolyte to the active material for its electrochemical requirements. This compressive force is generally exerted by the walls and the fixed intercell partitions, if present, of the battery container and this places a lower limit on the thickness of the material of the container since if the container is too thin it cannot exert the required compressive force.

The necessary electrolyte may be added to the cell packs of a recombination battery either when the cell packs are within the outer battery container or prior to their insertion into this container. In the latter case, it is desirable that the cell packs be subjected to a compressive force whilst being soaked with electrolyte, firstly because this avoids the separator material absorbing an excessive volume of electrolyte and secondly because if the electrolyte is added whilst a compressive force is applied the separator material tends to retain its compressed configuration which is the same configuration as that which is desirable in operation.

Conventional electric storage batteries of flooded type are assembled by forming a plurality of cell packs from separate positive and negative plates and sheets of separator material and subsequently connecting the plates of the same polarity within each cell pack and connecting the plates of one polarity in one cell pack to the plates of opposite polarity in an adjacent cell pack. A similar method of assembly may be adopted for recombination batteries also, but in an alternative method of assembly a laminated structure is built up from a plurality of interconnected plate arrays, each array including both positive and negative plates connected by means of integral bridges pieces and sufficient temporary links to impart adequate structural strength to the array. The laminated structure is formed by placing each plate of each polarity in registry with a plate of opposite polarity in the or each adjacent plate array but separated therefrom by separator material. A plurality of cuts is then made in the laminated structure severing the temporary links but leaving the bridge pieces to separate it into individual cell packs which are connected by the bridge pieces which constitute intercell connectors in the finished battery. It is desirable to clamp the laminated structure whilst forming the cuts to ensure that adjacent layers of the laminated structure remain precisely in registry and it is desirable also that this clamp permits the formation of several cuts without having to reposition the clamp.

According to the present invention a clamp for use in the assembly of multicell electric storage batteries, e.g. of recombination type, comprises two spaced opposing clamping members, each clamping member including a plurality of clamping elements which are interconnected but spaced apart, each clamping element being adapted to contact a surface of a respective cell pack of a battery, and biassing means connecting the two clamping members and adapted to urge each clamping element of each clamping member towards a corresponding clamping element on the other clamping member. The biassing means may include adjustment means to vary the biassing force. Each clamping element preferably affords a substantially planar clamping surface, the clamping surfaces of the or each clamping member being substantially coplanar. Preferably at least some of the clamping elements of each clamping member are disposed in a straight line and spaced apart in the direction of the line. The clamping elements of each clamping member may be disposed in two spaced parallel lines.

Thus the clamp in accordance with the present invention may be used to clamp and thus place under compression all the cell packs simultaneously of an electric battery. The clamp of the present invention is thus particularly adapted for use with a battery of the type in which the plates of all the cells lie in parallel, substantially common planes and such a battery is disclosed in British Patent Application No. 8230957 of the present applicants.

In order to ensure that substantially the same clamping force is applied to each cell pack the biassing means preferably comprises two or more members spaced apart in the direction of the length of the or each line of clamping elements. In the case in which the clamping elements are disposed in two spaced parallel lines it is preferred that the biassing means extend between the two clamping members in the gap between the two lines of clamping elements. It is preferred also that each clamping member has a plurality of holes formed therein since this not only represents an economy of material and a saving in weight but also permits electrolyte readily to flow into the cell packs.

The present invention also embraces a method of assembling an electric storage battery, e.g. of recombination type, including forming a plurality of cell packs, each cell pack comprising alternating positive and negative plates interleaved with separator material, the plates of the cell packs lying in substantially common parallel planes, placing each end surface of each cell pack in the plane of the plates in contact with a respective clamping element of one of two clamping members and urging the two clamping members together to compress each cell pack simultaneously transverse to the planes of its plates. In the preferred form of the method, one or more spaced lines of cell packs are formed, all of which are then compressed by the clamp. The two clamping members may be permanently connected together in their desired relative positions, e.g. by one or more plastic rivets, or the biasing means may include one or more nuts and bolts thus permitting the clamping force to be adjusted.

In the preferred form of the method, which may be used for assembling a battery of the type disclosed in the copending application referred to above, the plates of adjacent cell packs are connected together and the method includes separating connected plates by forming a plurality of cuts at positions corresponding to the gaps between adjacent clamping elements after urging the clamping members together. The clamp thus serves to register the connected plates prior to the formation of the cuts and to maintain this registry during the formation of the cuts.

The method may also include adding electrolyte to the cell packs of recombination batteries after urging the clamping members together and it will be appreciated that in this case the clamp is used to achieve the desired degree of compression of the separator material thus resulting in the absorption by the separator material of the desired volume of electrolyte. The volume of electrolyte may be somewhat greater than that actually required for operation of the battery, but subsequent to the adding of the electrolyte the battery is electrolytically formed, preferably while still engaged by the clamping members, and during this formation a certain proportion of electrolyte tends to be lost or can be deliberately lost by electrolysis, that is to say gassing off of the water in the electrolyte to the atmosphere. Alternatively or in addition the clamp may be further tightened after the electrolytic formation to increase the compression of the cell packs, thereby expelling a proportion of the electrolyte and/or bringing the cell packs to the degree of compression required for recombination operation and bringing the separator material back to the substantially saturated state.

The method may also include connecting all the plates of one polarity in at least one cell pack, preferably in two cell packs, that is to say those two cell packs which will constitute the two electrical end cells of the finished battery, by casting a bar around lugs projecting from the said plates after urging the clamping members together. It will be appreciated that it is essential that the cell packs, or at least those cell packs from which terminals are to extend, are subjected to substantially the same degree of compression as that to which they will be subjected in the final battery container prior to the formation of the terminal bar since the presence of the terminal bar prohibits any subsequent adjustment of the spacing of the plates to which it is connected.

After performing some or all of the various method steps referred to above, the cell packs are inserted into a battery container. Prior to this insertion the clamp may be removed but in one form of the invention the cell packs are inserted into an outer container without removing the clamp. In this event the clamp will form a permanent part of the final battery and will thus exert the compressive force on the cell packs which is required in service. This means that this compressive force is not exerted by the battery container and this container may therefore be constructed of thinner material than is normally possible or alternatively may be provided with less strengthening or reinforcement in the form of ribs or locally thickened portions or the like than is normally possible.

The present invention therefore also embraces an electric storage battery, e.g. of recombination type, including an outer container within which is a plurality of cell packs and a clamp, each cell pack comprising alternating positive and negative plates interleaved with material, the clamp including two clamping members each of which engages one surface of each cell pack and adjustment means urging the two clamping members together thereby compressing all the cell packs.

The present invention also embraces an intermediate structure formed during the method of assembly in accordance with the present invention. Thus the present invention also embraces a laminated structure comprising a plurality of superposed substantially planar arrays of battery plates interleaved with separator material, each plate being substantially in registry with a plate of opposite polarity in the or each adjacent array and at least certain of the plates being connected by one or more links to an adjacent plate whereby the laminated structure comprises a plurality of interconnected stacks of plates of alternating polarity, each end surface of each stack in the plane of the plates being engaged by a respective clamping element of a clamping member of a clamp as described above. It will be appreciated that in this laminated structure the cuts may already have been formed in which case certain pairs of plates will be connected by a bridge piece and that certain plates will be connected to no other plate or the cuts may not yet have been formed in which case every plate will be connected to at least one further plate by a bridge piece and/or a temporary link. This intermediate structure may be converted into an operational battery by completing the assembly steps referred to above.

Further features and details of the present invention will be apparent from the following description of one specific clamp in accordance with the present invention and of a method of assembling a recombination electric storage battery using such a clamp which is given by way of example only with reference to the accompanying drawings, in which.

Figure 1:
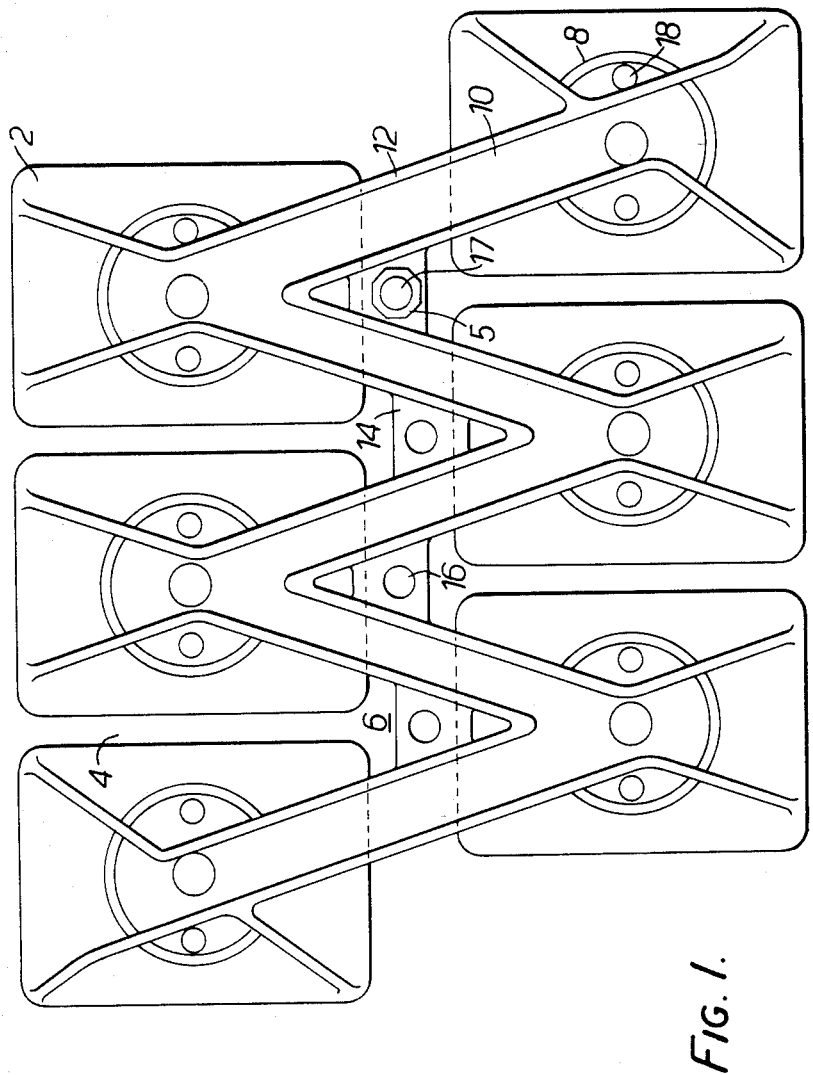
FIG. 1 is a plan view of a single clamping member of the clamp.
Figure 7:
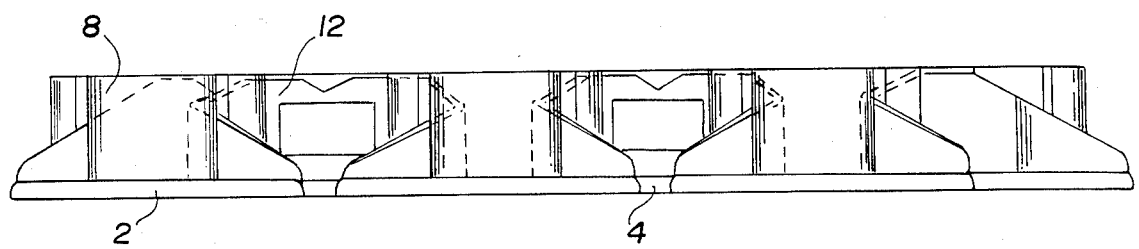
FIGS. 7 and 8 are side and end elevations respectively of the clamping member shown in FIG. 1.
Figure 8:
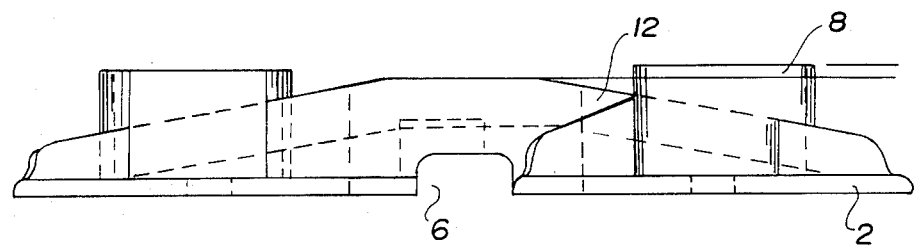

Referring firstly to FIGS. 1, 7 and 8, the clamp comprises two identical clamping members of which only one is illustrated. The clamping member comprises six clamping elements 2 of rectangular shape which have a planar undersurface (not visible in FIG. 1). The under surfaces of all the clamping elements are substantially coplanar. The clamping elements are arranged in two parallel straight lines of three clamping elements each and the clamping elements of each line are spaced from one another in the direction of the line by a gap 4 whilst the two lines are spaced apart by a gap 6. Each clamping element has a substantially planar upper surface and is reinforced by a substantially annular rib 8 upstanding from its upper surface and is connected to a single clamping element in the other line by an elongate arm comprising a substantially flat web 10 on each longitudinal side of which an upstanding rib 12 is provided to render the arm substantially rigid.

The clamping elements in each line are offset from those of the other line in the direction of the two lines by half a pitch, that is to say by a distance equal to one half of the dimension of the rectangular clamping elements in the direction of the length of the lines, and each adjacent pair of arms are thus disposed in a substantially V-shaped configuration. Each V is bridged by a single planar web 14 in which a hole 16 is provided which is situated above the gap 6 between the two lines of clamping elements. Each clamping element has a number, in this case 3, of holes 18 formed in it whose purpose will be described below. Each clamping member comprises an integral moulding, in this case of glass fibre filled polypropylene, and by virtue of the upstanding ribs is substantially rigid.

In use, two identical clamping members are positioned with their planar undersurfaces facing one another and are connected together by adjustable biassing means comprising a bolt or the like associated with a nut extending through each hole 16 by means of which the spacing of the two clamping members may be adjusted and the force exerted on cell packs between the complementary pairs of clamping elements thereby adjusted also. A single nut and a single bolt are shown in position in FIG. 1 and designated 15 and 17 respectively.

An exemplary method of assembly of a recombination electric storage battery using the clamp will now be described with reference to FIGS. 2 to 4 of the accompanying drawings. The method of assembly and the construction of the final battery may be very similar to that described in British patent application No. 8,230,957 referred to above.

Figure 2:
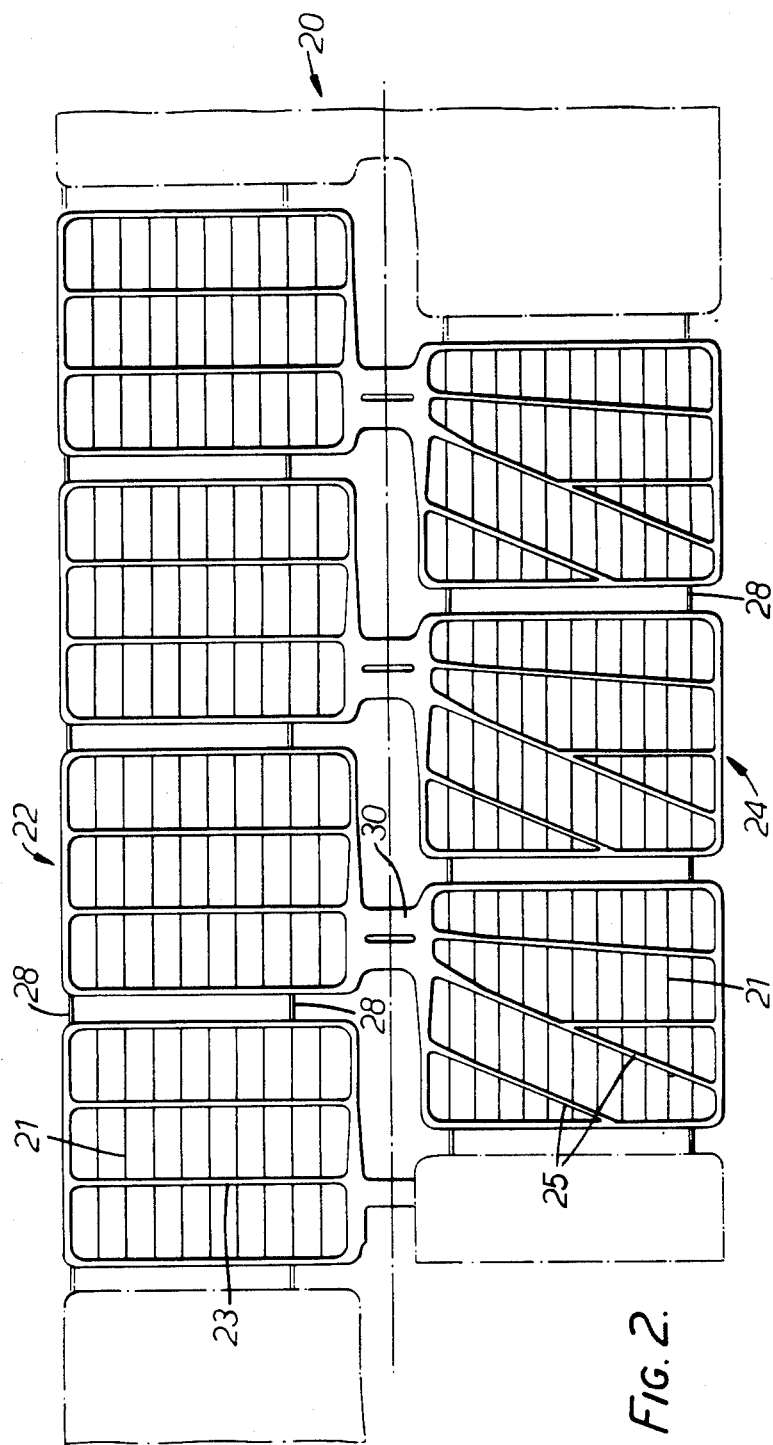
FIG. 2 is a diagrammatic view of a single plate array used in the assembly of the battery.

A plurality of elongate, continuously cast, composite plate arrays 20, as illustrated in FIG. 2, are provided, each comprising a plurality of rectangular negative plates 22 connected in a line and a plurality of rectangular, positive plates 24 connected in a similar parallel line which is spaced from it and offset with respect to it in the direction of the lines by half a pitch (for the sake of clarity the active electrode material of the plates is not shown). Each plate is connected to the adjacent plate of the same polarity by a temporary link constituted by two spaced bars 28 and to a plate of the opposite polarity by an integral bridge piece 30. The negative plates comprise two sets of mutually perpendicular parallel bars 21 and 23 whilst the positive plates comprise a set of parallel bars 21 interconnected by bars 25 radiating from the associated bridge piece 30. A sandwich or laminated structure is then formed, as shown in FIG. 3, from a plurality of such elongate plate members. The sandwich is formed by superposing plate arrays with the bridge pieces of each plate member offset by half a pitch, that is to say by half the distance between adjacent bridge pieces, from the bridge pieces of the plate member beneath it and with each plate of one polarity being superposed on a plate of the opposite polarity. Each pair of adjacent lines of plates are separated by a respective strip of compressible, fibrous absorbent separator material, in this case microfine glass fibre material, which terminates at or adjacent the respective bridge piece 30.

Since the plate arrays and strips of separator material which are used are continuous the resultant laminated structure is continuous also. One end of the continuous laminated structure is then placed on a clamping member of the clamp described above, or alternatively the laminated structure is built up on this clamping member, and the other clamping member is then placed in a corresponding position in contact with the upper surface of the laminated structure, with the clamping elements of each clamping member engaging respective plates. The two clamping members are then connected together by passing bolts through the holes 16 in the webs 14 and the laminated structure is placed under a compressive force by tightening the nuts on the bolts.

Figure 3:
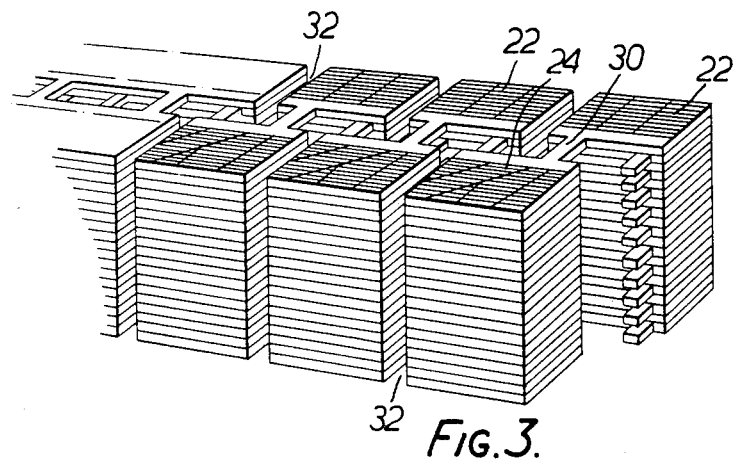
FIG. 3 is a diagrammatic perspective view of a stack of such plate arrays interleaved with separator material.
Figure 4:
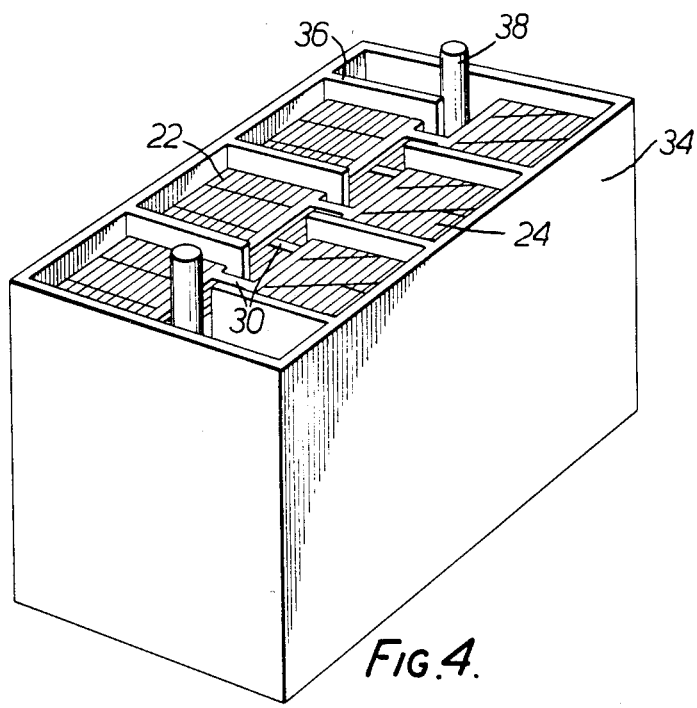
FIG. 4 is a diagrammatic perspective view of a partly assembled battery.

A plurality of cuts 32 are then formed in each side of the laminated structure at one or both ends of each line of clamping elements and in the gap 4 between each adjacent pair of clamping elements to sever all the temporary links in each line to produce a structure as illustrated in the right-hand half of FIG. 3. It will be appreciated that this structure constitutes an entire battery element comprising two spaced, parallel lines of three cell packs each, each of which is constituted by a stack of what are now separate positive and negative plates interleaved with a separator of microfine glass fibre material. Adjacent cell packs in the same line are not connected but each plate of each polarity in each line is connected to a plate of the opposite polarity in the other line by a respective bridge piece 30. By virtue of the longitudinally offset arrangement of adjacent plate members the bridge pieces are disposed in a plurality of stacks spaced apart in the direction of the length of the lines of cell packs and each stack of bridge pieces will constitute an intercell connector in the finished battery. It will be appreciated that the six separated cell packs shown in FIG. 3 are connected to the remainder of the continuous laminated structure by a stack of bridge pieces and this is subsequently severed.

In an alternative form of the method, the plate members are not continuous but have a length equal to that of the desired battery and thus each battery element is built up individually and there is no need to separate this battery element from a continuous laminated structure.

Each stack of bridge pieces or severed bridge pieces at each end of the battery element is then connected together by casting a bar around them using a conventional two part mould or the like. The bar extends beyond the planes of the plates and there constitutes a terminal connector 38 (FIG. 4). Electrolyte is then added to the cell packs, for instance by immersing the battery element in electrolyte. Permeation of the electrolyte into the cell packs is promoted by the provision of the holes 18 and the volume of electrolyte absorbed is determined by the compressive force exerted by the clamp.

The battery element is then placed in its final outer container 34 which, in this embodiment, is provided with integral intercell partitions 36 which are connected to the side walls in positions which correspond to the positions of the cuts 32 in the battery element and extend substantially half way across the width of the container. The clamp may be removed from the battery element and the element then inserted into the container, as shown in FIG. 4, with the partitions 36 accommodated in the cuts 32. Alternatively, the clamp is left in position and inserted into the container with the battery element. It will be appreciated that the bolts connecting the two clamping members are accommodated in the gap between the two lines of cell packs and will not impede the operation of the battery but the height of the battery container will have to be somewhat increased so as to accommodate the clamp.

Figure 5:
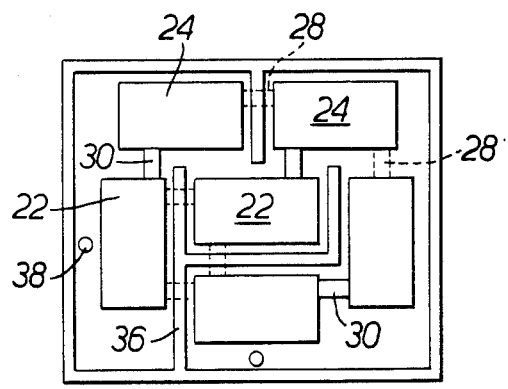
FIGS. 5 and 6 are diagrammatic plan views of a modified construction of battery showing only the top layer of plates and the layer below the top layer respectively.
Figure 6:
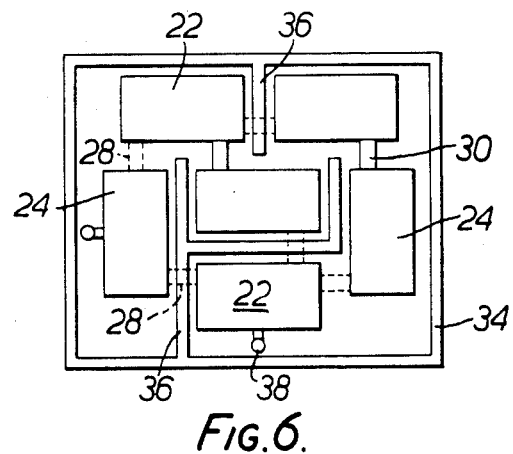

In a modified form of the method, two different constructions of plate array are cast, the plates of the two types of array being disposed in the assymmetrical configurations shown in FIGS. 5 and 6 respectively and connected together by a plurality of integral bridge pieces 30 and integral temporary links 28 (shown in dotted lines). A laminated structure is formed with the two types of array alternating and each plate being in registry with a plate of opposite polarity in the or each adjacent array. The laminated structure is then clamped with the aid of a clamp (not shown) having clamping elements disposed in the configuration of the plates in FIGS. 5 and 6 and suitably interconnected. Cuts are then made between adjacent stacks of plates to sever the links 28 leaving the bridge pieces 30. The resultant battery element is ultimately placed into an outer container having fixed intercell partitions 36 in the positions shown separating those cells which are adjacent but not directly connected by a stack of bridge pieces 30. In other respects the assembly of the battery proceeds as in the previous embodiment.

Typical compositions for the positive and negative active material pastes are given in the table below:

|  | Positive | Negative |
| --- | --- | --- |
| Grey Oxide (PbO) (Kilograms) | 13.62 | 13.62 |
| Barium sulphate (grams) | — | 68 |
| Carbon black (grams) | — | 23 |
| Lead Stearate (grams) | — | 7 |
| Lignosulphonate sold under the Trade Mark VANISPERSE (grams) | — | 45 |
| Polyester fibre (3 mm) (grams) | 11.5 | 11.5 |
| Water (liters) | 1.68 | 1.53 |
| $H_2SO_4$ (1.4 specific gravity) (liters) | 1.02 | 0.87 |

The sulphuric acid electrolyte added to the battery typically has a specific gravity of 1.24 and is added in an amount of 0.417 liters per kilogram of total active material in the battery.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. A method of assembling an electric storage battery comprising forming a plurality of cell packs, each cell pack comprising alternating positive and negative plates interleaved with separator material, the plates of the cell packs lying in substantially common parallel planes, placing each end surface of each cell pack that is parallel to the plane of the plates in contact with a respective clamping element of one of two clamping members of a clamp, said clamp comprising two spaced opposing clamping members with each clamping member having a plurality of clamping elements which are interconnected but spaced apart and urging the two clamping members together to compress each cell pack simultaneously transverse to the planes of its plates.

2. The method of claim 1 which includes forming one or more lines of interconnected cell packs, the plates of adjacent cell packs in each line being connected and including separating connected plates by forming a plurality of cuts at positions between adjacent clamping elements after urging the clamping members together.

3. A method of assembling an electric storage battery comprising forming a plurality of cell packs, each cell pack comprising alternating positive and negative plates interleaved with separator material, the plates of the cell packs lying in substantially common parallel planes, placing each end surface of each cell pack that is parallel to the plane of the plates in contact with one of two clamping members and urging the two clamping members together to compress each cell pack simultaneously transverse to the planes of it plates.

4. The method of claim 3 which includes permanently connecting the clamping members to maintain the desired compression.

5. The method of claim 3 in which all of the plates of one polarity in at least one cell pack have lugs projecting from them, including connecting the lugs together by casting a bar around the lugs after urging the clamping members together.

6. The method of claim 3 which includes adding electrolyte to the cell packs after urging the clamping members together.

7. The method of claim 3 which includes electrolytically forming the plates of the cell packs while the cell packs are compressed by the clamping members.

8. The method of claim 7 which includes urging the clamping members further together after electrolytic formation to increase the compression of the cell packs.

9. The method of claim 3 which includes forming the plurality of cell packs into two spaced parallel lines of interconnected cell packs and in which each plate, with the exception of every alternate plate in the cell pack at one end of each line, is integrally connected to a plate of opposite polarity in the other line by a connector which extends across the gap between the two lines.

10. The method of claim 3 in which the cell packs are subsequently inserted into an outer container without removing the clamping members.

* * * * *